(12) United States Patent
Feng et al.

(10) Patent No.: US 8,182,946 B2
(45) Date of Patent: May 22, 2012

(54) TIN AND TIN-ZINC PLATED SUBSTRATES TO IMPROVE NI-ZN CELL PERFORMANCE

(75) Inventors: Feng Feng, San Diego, CA (US); Jeffrey Phillips, La Jolla, CA (US); Samaresh Mohanta, San Diego, CA (US); Jeff Barton, San Diego, CA (US); Zeiad M. Muntasser, San Diego, CA (US)

(73) Assignee: Powergenix Systems, Inc., La Jolla, CA (US)

( * ) Notice: Subject to any disclaimer, the term of this patent is extended or adjusted under 35 U.S.C. 154(b) by 0 days.

(21) Appl. No.: 13/069,879

(22) Filed: Mar. 23, 2011

(65) Prior Publication Data

US 2011/0168565 A1 Jul. 14, 2011

Related U.S. Application Data

(62) Division of application No. 11/868,337, filed on Oct. 5, 2007, now Pat. No. 7,931,988.

(51) Int. Cl.
| | |
|---|---|
| *H01M 4/66* | (2006.01) |
| *H01M 4/42* | (2006.01) |
| *H01M 4/48* | (2010.01) |
| *C23C 28/00* | (2006.01) |
| *C25D 3/22* | (2006.01) |
| *C25D 3/30* | (2006.01) |

(52) U.S. Cl. ........ 429/245; 429/231; 429/229; 205/191; 205/300; 205/305

(58) Field of Classification Search ............... 429/231.5, 429/218.1, 231, 229, 245; 205/722, 705, 205/302, 300, 305, 191
See application file for complete search history.

(56) References Cited

U.S. PATENT DOCUMENTS

| | | | |
|---|---|---|---|
| 5,104,501 A | * | 4/1992 | Okabayashi ................ 205/722 |
| 5,470,667 A | | 11/1995 | Carey, II et al. |
| 5,489,490 A | | 2/1996 | Carey, II et al. |
| 5,491,035 A | | 2/1996 | Carey, II et al. |

(Continued)

FOREIGN PATENT DOCUMENTS

CN 2632866 Y 8/2004

(Continued)

OTHER PUBLICATIONS

International Search Report and Written Opinion, dated Dec. 19, 2008, issued in corresponding International Application No. PCT/US2008/078335.

(Continued)

*Primary Examiner* — Jonathan Crepeau
*Assistant Examiner* — Kenneth Douyette
(74) *Attorney, Agent, or Firm* — Weaver Austin Villeneuve & Sampson LLP

(57) ABSTRACT

An improved Ni—Zn cell with a negative electrode substrate plated with tin or tin and zinc during manufacturing has a reduced gassing rate. The copper or brass substrate is electrolytic cleaned, activated, electroplated with a matte surface to a defined thickness range, pasted with zinc oxide electrochemically active material, and baked. The defined plating thickness range of 40-80 μIn maximizes formation of an intermetallic compound $Cu_3Sn$ that helps to suppress the copper diffusion from under plating layer to the surface and eliminates formation of an intermetallic compound $Cu_6Sn_5$ during baking to provide adequate corrosion resistance during battery operation.

19 Claims, 6 Drawing Sheets

U.S. PATENT DOCUMENTS

| | | | |
|---|---|---|---|
| 5,491,036 A | 2/1996 | Carey, II et al. | |
| 5,597,656 A | 1/1997 | Carey, II et al. | |
| 5,616,424 A | 4/1997 | Carey, II et al. | |
| 5,667,849 A | 9/1997 | Carey, II et al. | |
| 5,695,822 A | 12/1997 | Carey, II et al. | |
| 5,837,120 A | 11/1998 | Forand et al. | |
| 6,030,516 A * | 2/2000 | O'Driscoll | 205/302 |
| 6,080,497 A | 6/2000 | Carey, II et al. | |
| 6,149,781 A | 11/2000 | Forand | |
| 6,193,858 B1 | 2/2001 | Hradil et al. | |
| 6,495,289 B1 | 12/2002 | Kawakami | |
| 6,652,990 B2 | 11/2003 | Carey, II et al. | |
| 6,794,060 B2 | 9/2004 | Carey, II et al. | |
| 6,800,186 B1 | 10/2004 | Forand et al. | |
| 6,811,891 B2 | 11/2004 | Carey, II et al. | |
| 6,861,159 B2 | 3/2005 | Carey, II et al. | |
| 7,045,221 B2 | 5/2006 | Carey, II et al. | |
| 7,122,279 B2 | 10/2006 | Tamura et al. | |
| 2003/0079811 A1 | 5/2003 | Carey, II et al. | |
| 2003/0089432 A1 | 5/2003 | Carey, II et al. | |
| 2003/0170485 A1 | 9/2003 | Carey, II et al. | |
| 2003/0175547 A1 | 9/2003 | Carey, II et al. | |
| 2003/0190528 A1 | 10/2003 | Saidi | |
| 2003/0196732 A1 | 10/2003 | Carey, II et al. | |
| 2004/0023119 A1 | 2/2004 | Mizutani et al. | |
| 2004/0053131 A1 | 3/2004 | Tanizaki et al. | |
| 2004/0214029 A1 | 10/2004 | Carey, II et al. | |
| 2004/0219432 A1 | 11/2004 | Kojima et al. | |
| 2006/0094309 A1 | 5/2006 | Holtkamp et al. | |
| 2006/0121351 A1 * | 6/2006 | Sato et al. | 429/231.95 |
| 2006/0172197 A1 | 8/2006 | Zhu | |
| 2006/0207084 A1 | 9/2006 | Phillips et al. | |
| 2007/0104975 A1 | 5/2007 | Carey, II et al. | |

FOREIGN PATENT DOCUMENTS

| | | |
|---|---|---|
| EP | 0855752 | 7/1998 |
| FR | 2796496 A | 1/2001 |
| JP | 2001 085018 | 3/2001 |
| JP | 2004111329 A | 4/2004 |
| WO | WO 01/91224 | 11/2001 |
| WO | WO 2003104532 | 12/2003 |
| WO | WO 2004029316 | 4/2004 |
| WO | WO 2005/004254 | 1/2005 |
| WO | WO 2006/118791 | 11/2006 |
| WO | WO 2007/146192 | 12/2007 |

OTHER PUBLICATIONS

EP Office Action, dated Nov. 8, 2010, issued in corresponding EP Application No. 08 836 600 0.

Official English Translation of: JP 2004/111329 A, Tamura et al., Apr. 2004.

Machine Translation of JP 2004/111329 A, Tamura et al., Apr. 2004.

Machine Translation of FR 2,796,496 A, Chouquais, Jan. 2001.

Tamura et al., "Study on the anode behavior of Sn and Sn-Cu alloy thin-film electrodes," Journal of Power Sources, vol. 107, Issue 1, Apr. 20, 2002, pp. 48-55.

* cited by examiner

TIN AND TIN-ZINC PLATED SUBSTRATES TO IMPROVE NI-ZN CELL PERFORMANCE

CROSS-REFERENCE TO RELATED APPLICATIONS

This application is a divisional of U.S. application Ser. No. 11/868,337, filed Oct. 5, 2007, now U.S. Pat. No. 7,931,988, the content of which is incorporated by reference herein in its entirety.

FIELD OF THE INVENTION

The present invention relates to rechargeable batteries and, more particularly to nickel zinc rechargeable battery cells. Even more specifically, this invention pertains to composition and structure of current collectors for negative paste in zinc electrodes.

BACKGROUND

A cylindrical battery cell employs alternating electrode and electrolyte layers. Each electrode may include a current collector substrate and one or more electrochemically active layers. Among the considerations for the current collector design are the following: (a) high electrical conductivity; (b) resistance to corrosion by the electrolyte used; (c) resistance to electrochemical reactions so as not to be consumed too quickly; (d) mechanical strength and flexibility allowing it withstand manufacturing operations (e.g., pasting and rolling); (e) low overall cost, including material cost and manufacturing; and (f) a surface structure providing good physical contact, or "connectivity," to the electrochemically active layers (e.g., the material should not form a passivating film so as to prevent the good physical contact and should adhere well to the electrochemically active layers). It is not critical that any one or more of these features be met. For example, a current collector may be outstanding in one or more categories and yet be sub-standard in others. Thus, a material having disadvantages in one aspect may still be used if the disadvantages may be overcome by the overall battery design. Common materials currently used for zinc negative electrode current collectors include copper and brass.

One way to evaluate cell performance and establish the relationship between features of the current collector and cell performance is to measure the gassing rate of current collector strips under conditions. During battery operation, gases such as hydrogen may be evolved. Although some evolved hydrogen may be recombine with oxygen to produce water, the remaining hydrogen would build up in the cell and may cause cell rupture or damage conductive pathways. It is desirable to design cell components that have low out-gassing rates.

SUMMARY

An improved Ni—Zn cell with a current collector substrate is manufactured with tin or tin and zinc plating to achieve a reduced gassing rate. The copper or brass substrate electrolytic cleaned, activated with a matte surface, electroplated to a defined thickness range, pasted with a zinc oxide based electrochemically active material and baked. The defined thickness range of 40-80 µIn eliminates formation of an intermetallic compound $Cu_6Sn_5$ during baking, improves plating layer stability and provides adequate corrosion resistance during battery operation. The improved current collector provides high electrical conductivity, resistance to corrosion and electrochemical reactions, good mechanical strength and flexibility, and good interface to the electrochemically active layers.

In one aspect, the present invention pertains to a method to manufacture a zinc electrode substrate for a nickel zinc battery cell. The method may include providing a perforated strip of substrate material, degreasing the strip, electrolytic cleaning the strip, activating the strip, and electroplating a layer of metal or alloy including tin or tin-zinc at a thickness of about 40-80 µIn. The substrate material may be copper or brass. The metal electroplated may be tin or both tin and zinc, which may be about 75-100% weight tin and about 0-25% weight zinc.

The perforated strip may be degreased with denatured alcohol or other organic solvents for a period of time, which may be 5-15 minutes. In between the degreasing operation and the electrolytic cleaning operation, the perforated strip may be rinsed with DI water. The electrolytic cleaning operation comprises immersing the perforated strip in an alkaline soak solution and conducting a current through the strip. For example, the current may be 1-3 amps for a 15 inch perforated strip when the cleaning is conducted for 5-10 minutes. More or less current may be used to ensure the surface is pure, uniform, and smooth. The alkaline soak solution may have a pH of 10-13 and may comprise of an alkaline hydroxide, an alkaline carbonate, an alkaline phosphate, or a combination of two or all of these. The alkaline hydroxide may be sodium hydroxide or potassium hydroxide. The alkaline carbonate may be sodium carbonate or potassium carbonate. The alkaline phosphate may be sodium phosphate or potassium phosphate or may be substituted with sodium acetate.

The perforated strip may be activated in an activation solution for a period of about 5-10 minutes. The activation operation produces a matted surface. The activation solution may be an acid. Particularly, the activation solution may be sulfuric acid at an acid concentration of 4-20%. Other strong acids may be substituted instead of the sulfuric acid. The activation solution may have a pH of less than 1-3. Before and after the activation operation, the perforated strip substrate may be rinsed with DI water to remove the chemicals from the previous operation.

The perforated strip is electroplated to deposit 40-80 µIn of metal. The metal may be tin or both tin and zinc. The electroplated layer on the substrate may be an alloy of tin with copper and optionally zinc. The current density may be 40-80 $A/m^2$ for a period of about 4-6 minutes. In certain embodiments, current density may be 40-70, or about 60 $A/m^2$ for about 4-6 minutes.

The electroplating bath may include tin ion or zinc ion sources and a current carrier source. Preferably, the electroplating bath also includes an oxidation retardant, an anti-treeing agent, and no brightening agent. The tin ion source may be stannous sulfate ($SnSO_4$) and its concentration may be about 50-300 grams per liter. Other sources of tin ions may be used, e.g., stannous chloride ($SnCl_2$), stannous fluoborate ($Sn(BF_4)_2$) or stannous methanesulfonate ($Sn(CH_3SO_3)_2$). The zinc ion source may be zinc chloride ($ZnCl_2$), zinc sulfate ($ZnSO_4$) or zinc pyrophosphate ($Zn_2P_2O_7$) at a concentration about 10-100 grams per liter. The current carrier source may be any acid that can provide sufficient conductivity for the plating bath. For example, the current carrier source may be sulfuric acid, acetic acid, boric acid, sodium sulfate, fluoboric acid, cresol sulfonic acid, methanesulfonic acid ($CH_3SO_3H$) or sulfamic acid at a concentration of about 50-250 grams per liter. The oxidation retardant serves to retard the oxidation of stannous tin and may be cresolsulfonic or phenolsulfonic acids. The concentration may be about 50-100 grams per liter. The treeing effect is excessive deposition forming dendrites and other irregular shapes. Treeing may reduce the life of a cell because it may create undesired conductive pathways or cause non-uniform depletion of the electrochemically active materials. Anti-treeing agents may be naphthol, dihydroxydiphenylsulfone, glue, gelatin, or cresol. The naphthol or dihydroxydiphenylsulfone may be used at a concentration of 0.5-10 grams per liter. Glue, gelatin, or cresol may be used at a concentration of 0.2-12 grams per liter. The plating bath may have a pH of 0.1-3.

An electrochemically active material, preferably a paste containing zinc oxide, may be applied to the substrate. The substrate and the zinc oxide based paste may then be baked by maintaining their temperature at about 200-350° C. for a period of about 30 minutes to 2 hours. In certain embodiments, the baking may be accomplished by maintaining the temperature at 260° C. for a period of about 45 minutes. For unbaked tin plated substrates, the room temperature storage for one month results in copper diffusion to substrate surface. The copper amount on substrate surface varies from 2 to 35% depending on plating thickness. No intermetallic compounds are formed during room temperature storage. The baking promotes copper diffusion of the substrate material into the electroplated layer to form copper/tin alloy with high copper content and intermetallic compounds ($Cu_3Sn$ and/or $Cu_6Sn_5$). When the substrate is electroplated with a thick layer of tin (e.g., more than 200 μIn) and baked at 200-350° C. for 30 minutes to 2 hours, the tin-copper intermetallic compounds are formed in the plating layer and cause the surface to blister. The blistering leads to higher gassing rate and is detrimental to cell performance. At a plated thickness of less than 20 μIn, no intermetallic compound is formed in the plated layer. At a plated thickness of about 40-80 μIn, the plating layer includes mostly tin/copper alloy and a thin layer of (~10-40%) of intermetallic compound ($Cu_3Sn$). At a plated thickness of more than 200 μIn, both compounds $Cu_3Sn$ (~5-15%) and $Cu_6Sn_5$ (~85-95%) are formed and can be clearly identified from color or shape difference in a SEM photo.

Formation of $Cu_3Sn$ is preferred at substrate/plating layer interface over $Cu_6Sn_5$ because intermetallic compound $Cu_3Sn$ layer helps to suppress the copper diffusion from under plating layer to the surface during baking and $Cu_6Sn_5$ compounds are irregular, brittle, and less conductive than $Cu_3Sn$. The density of $Cu_6Sn_5$ is small and thus has large volume which generates compression stress. The $Cu_6Sn_5$ may crack during subsequent manufacturing operations, creating a weak point for corrosion and reduce conductivity.

In another aspect, the present invention pertains to a nickel zinc battery cell having the improved substrate current collector. The cell includes a negative electrode layer, a positive electrode layer with nickel, and a separator layer. The negative electrode layer includes a current collector and a zinc oxide based electrochemically active layer. The current collector may be a substrate of copper or brass without formation of detrimental intermetallic compound (i.e. $Cu_6Sn_5$) after baking. The plating layer may have a thickness of about 40-80 μIn to provide maximum protection from substrate and paste corrosion and excellent plating layer stability. In one embodiment, the thickness may be about 60 μIn. In certain embodiments, the intermetallic compound may only comprise $Cu_3Sn$.

In another aspect, the present invention pertains to a negative electrode structure. The structure includes a current collector and a zinc oxide based electrochemically active layer. The current collector may be a copper or brass substrate having a tin or tin/zinc plating with a thickness of about 40-80 μIn. In certain embodiments, the current collector may have a structure including tin plating at a thickness of about 60 μn. In other embodiments, the current collector may have a structure including tin/zinc plating at a thickness of about 55 μIn.

These and other features and advantages of the present invention will be described in more detail below with reference to the associated drawings.

DETAILED DESCRIPTION OF THE PREFERRED EMBODIMENTS

Introduction

In the following detailed description of the present invention, numerous specific embodiments are set forth in order to provide a thorough understanding of the invention. However, as will be apparent to those skilled in the art, the present invention may be practiced without these specific details or by using alternate elements or processes, employing the spirit and scope of the invention. In other instances well-known processes, procedures and components have not been described in detail so as not to unnecessarily obscure aspects of the present invention.

The present invention pertains to methods of manufacturing a nickel zinc cell, particularly the process of manufacturing the negative electrode. A negative electrode may have a metallic copper or brass based substrate current collector. During the manufacturing process, the substrate is electrolytic cleaned and electroplated with tin or both tin and zinc. Then a zinc oxide based electrochemically active material is pasted onto the plated substrate. The substrate and paste are baked to form tin/copper alloys and intermetallic compounds. The process favors formation of tin/copper alloys and certain intermetallic compounds that protects the substrate material from corrosion forces and is amenable to further manufacturing operations. The process disfavors formation of certain intermetallic compounds that affects the electrode performance negatively. The disfavored intermetallic compounds may be irregular, brittle, and/or less conductive than other compounds. As result, the nickel zinc battery made using the inventive process has a reduced gassing rate and exhibits better capacity for both low rate and high rate applications.

In order to frame the context of this invention, the general battery cell structure will now be described.

General Cell Structure

Figure 1B:
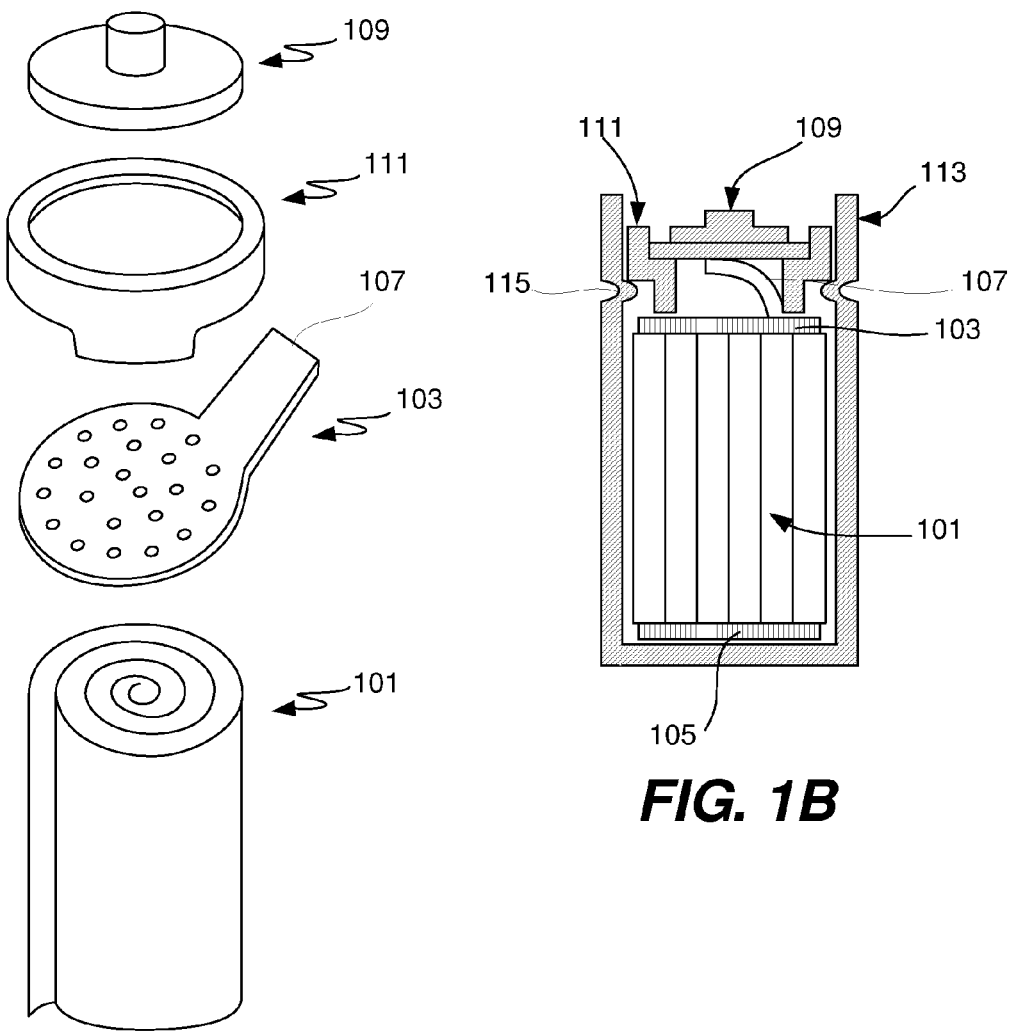
FIG. 1B is a diagrammatic cross-sectional view of an assembled nickel zinc battery cell in accordance with the present invention.
Figure 1A:
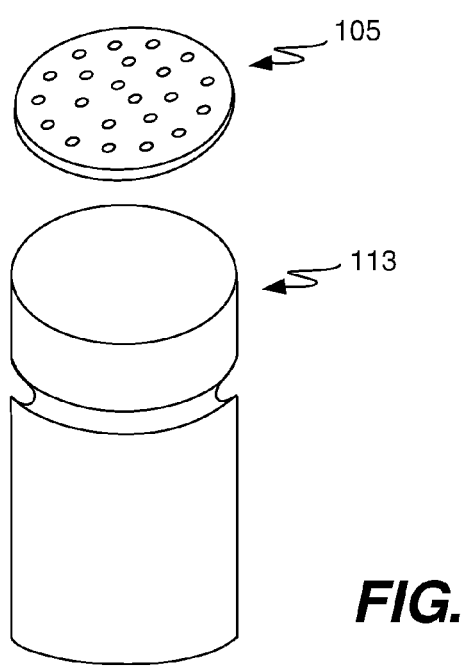
FIG. 1A is an exploded diagram of a nickel zinc battery cell in accordance with the present invention.

FIGS. 1A and 1B are graphical representations of the main components of a cylindrical power cell according to an embodiment of the invention, with FIG. 1A showing an exploded view of the cell. Alternating electrode and electrolyte layers are provided in a cylindrical assembly 101 (also called a "jellyroll"). The cylindrical assembly or jellyroll 101 is positioned inside a can 113 or other containment vessel. A negative collector disk 103 and a positive collector disk 105 are attached to opposite ends of cylindrical assembly 101. The negative and positive collector disks function as internal terminals, with the negative collector disk electrically connected to the negative electrode and the positive collector disk electrically connected to the positive electrode. A cap 109 and the can 113 serve as external terminals. In the depicted embodiment, negative collector disk 103 includes a tab 107 for connecting the negative collector disk 103 to cap 109. Positive collector disk 105 is welded or otherwise electrically connected to can 113. In other embodiments, the negative collector disk connects to the can and the positive collector disk connects to the cap.

The negative and positive collector disks 103 and 105 are shown with perforations, which may be employed to facilitate bonding to the jellyroll and/or passage of electrolyte from one portion of a cell to another. In other embodiments, the disks may employ slots (radial or peripheral), grooves, or other structures to facilitate bonding and/or electrolyte distribution.

A flexible gasket 111 rests on a circumferential bead 115 provided along the perimeter in the upper portion of can 113, proximate to the cap 109. The gasket 111 serves to electrically isolate cap 109 from can 113. In certain embodiments, the bead 115 on which gasket 111 rests is coated with a polymer coating. The gasket may be any material that electrically isolates the cap from the can. Preferably the material does not appreciably distort at high temperatures; one such material is nylon. In other embodiments, it may be desirable to use a relatively hydrophobic material to reduce the driving force that causes the alkaline electrolyte to creep and ultimately leak from the cell at seams or other available egress points. An example of a less wettable material is polypropylene.

After the can or other containment vessel is filled with electrolyte, the vessel is sealed to isolate the electrodes and electrolyte from the environment as shown in FIG. 1B. The gasket is typically sealed by a crimping process. In certain embodiments, a sealing agent is used to prevent leakage. Examples of suitable sealing agents include bituminous sealing agents, tar and VERSAMID® available from Cognis of Cincinnati, Ohio.

In certain embodiments, the cell is configured to operate in an electrolyte "starved" condition. Further, in certain embodiments, the nickel-zinc cells of this invention employ a starved electrolyte format. Such cells have relatively low quantities electrolyte in relation to the amount of active electrode material. They can be easily distinguished from flooded cells, which have free liquid electrolyte in interior regions of the cell. As discussed in U.S. patent application Ser. No. 11/116,113, filed Apr. 26, 2005, titled "Nickel Zinc Battery Design," hereby incorporated by reference, it may be desirable to operate a cell at starved conditions for a variety of reasons. A starved cell is generally understood to be one in which the total void volume within the cell electrode stack is not fully occupied by electrolyte. In a typical example, the void volume of a starved cell after electrolyte fill may be at least about 10% of the total void volume before fill.

The battery cells of this invention can have any of a number of different shapes and sizes. For example, cylindrical cells of this invention may have the diameter and length of conventional AAA cells, AA cells, A cells, C cells, etc. Custom cell designs are appropriate in some applications. In a specific embodiment, the cell size is a sub-C cell size of diameter 22 mm and length 43 mm. Note that the present invention also may be employed in relatively small prismatic cell formats, as well as various larger format cells employed for various non-portable applications. Often the profile of a battery pack for, e.g., a power tool or lawn tool will dictate the size and shape of the battery cells. This invention also pertains to battery packs including one or more nickel zinc battery cells of this invention and appropriate casing, contacts, and conductive lines to permit charge and discharge in an electric device.

Note that the embodiment shown in FIGS. 1A and 1B has a polarity reversed of that in a conventional NiCd cell, in that the cap is negative and the can is positive. In conventional power cells, the polarity of the cell is such that the cap is positive and the can or vessel is negative. That is, the positive electrode of the cell assembly is electrically connected with the cap and the negative electrode of the cell assembly is electrically connected with the can that retains the cell assembly. In a certain embodiments of this invention, including that depicted in FIGS. 1A and 1B, the polarity of the cell is opposite of that of a conventional cell. Thus, the negative electrode is electrically connected with the cap and the positive electrode is electrically connected to the can. It should be understood that in certain embodiments of this invention, the polarity remains the same as in conventional designs—with a positive cap.

Cell Can

The can is the vessel serving as the outer housing or casing of the final cell. In conventional nickel-cadmium cells, where the can is the negative terminal, it is typically nickel-plated steel. As indicated, in this invention the can may be either the negative or positive terminal. In embodiments in which the can is negative, the can material may be of a composition similar to that employed in a conventional nickel cadmium battery, such as steel, as long as the material is coated with another material compatible with the potential of the zinc electrode. For example, a negative can may be coated with a material such as copper to prevent corrosion. In embodiments where the can is positive and the cap negative, the can may be a composition similar to that used in convention nickel-cadmium cells, typically nickel-plated steel.

In some embodiments, the interior of the can may be coated with a material to aid hydrogen recombination. Any material that catalyzes hydrogen recombination may be used. An example of such a material is silver oxide.

Venting Cap

Although the cell is generally sealed from the environment, the cell may be permitted to vent gases from the battery that are generated during charge and discharge. A typical nickel cadmium cell vents gas at pressures of approximately 200 Pounds per Square Inch (PSI). In some embodiments, a nickel zinc cell of this invention is designed to operate at this pressure and even higher (e.g., up to about 300 PSI) without the need to vent. This may encourage recombination of any oxygen and hydrogen generated within the cell. In certain embodiments, the cell is constructed to maintain an internal pressure of up to about 450 PSI and or even up to about 600 PSI. In other embodiments, a nickel zinc cell is designed to vent gas at relatively lower pressures. This may be appropriate when the design encourages controlled release of hydrogen and/or oxygen gases without their recombination within the cell.

Figure 2:
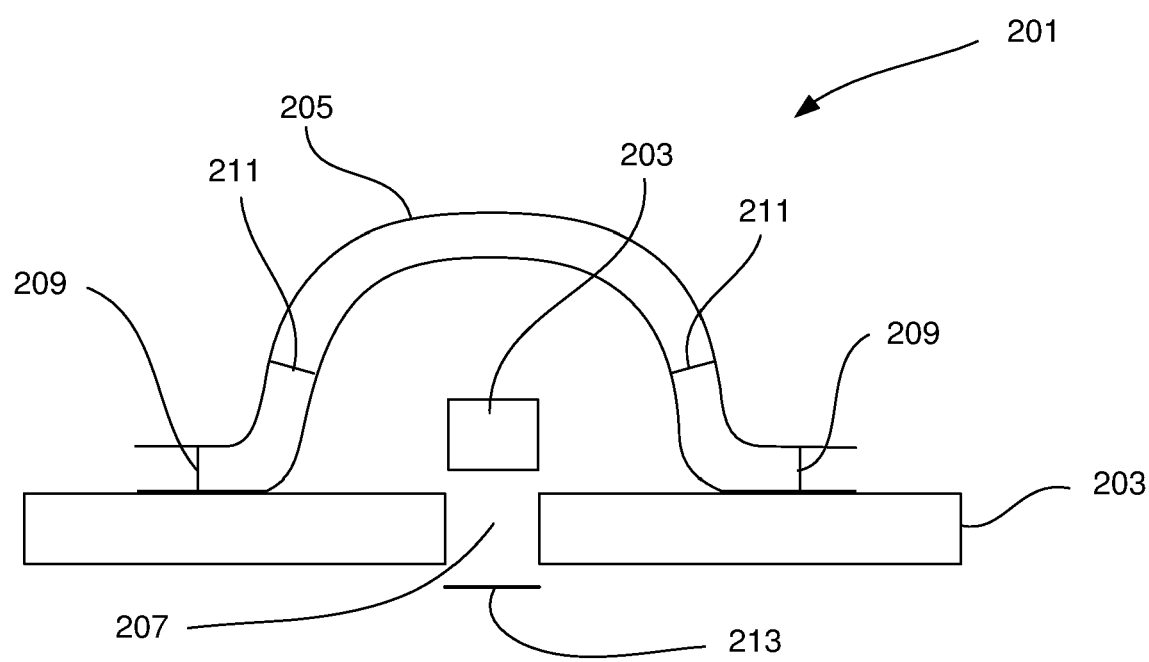
FIG. 2 presents a diagram of a cap and vent mechanism according to one embodiment of the invention.

FIG. 2 is a representation of a cap 201 and vent mechanism according to one embodiment of the invention. The vent mechanism is preferably designed to allow gas but not electrolyte to escape. Cap 201 includes a disk 208 that rests on the gasket, a vent 203 and an upper portion 205 of cap 201. Disk 208 includes a hole 207 that permits gas to escape. Vent 203 covers hole 207 and is displaced by escaping gas. Vent 203 is typically rubber, though it may be made of any material that permits gas to escape and withstands high temperatures. A square vent has been found to work well. Upper portion 205 is welded to disk 208 at weld spots 209 and includes holes 211 to allow the gas to escape. The locations of weld spots 209 and 211 shown are purely illustrative and these may be at any suitable location. In a preferred embodiment, the vent mechanism includes a vent cover 213 made of a hydrophobic gas permeable membrane. Examples of vent cover materials include microporous polypropylene, microporous polyethylene, microporous PTFE, microporous FEP, microporous fluoropolymers, and mixtures and co-polymers thereof (see e.g., U.S. Pat. No. 6,949,310 (J. Phillips), "Leak Proof Pressure Relief Valve for Secondary Batteries," issued Sep. 27, 2005, which is incorporated herein by reference for all purposes). The material should be able to withstand high temperatures.

In certain embodiments, hydrophobic gas permeable membranes are used in conjunction with a tortuous gas escape route. Other battery venting mechanisms are known in the art and are suitable for use with this invention. In certain embodiments, a cell's materials of construction are chosen to provide regions of hydrogen egress. For example, the cells cap or gasket may be made from a hydrogen permeable polymeric material. In one specific example, the outer annular region of the cell's cap is made from a hydrogen permeable material such as an acrylic plastic or one or more of the polymers listed above. In such embodiments, only the actual terminal (provided in the center of the cap and surrounded by the hydrogen permeable material) need be electrically conductive.

Some details of the structure of a vent cap and current collector disk, as well as the carrier substrate itself, are found in the following patent applications which are incorporated herein by reference for all purposes: PCT/US2006/015807 filed Apr. 25, 2006 and PCT/US2004/026859 filed Aug. 17, 2004 (publication WO 2005/020353 A3).

The Electrodes-Separator Sandwich Structure

Figure 3:
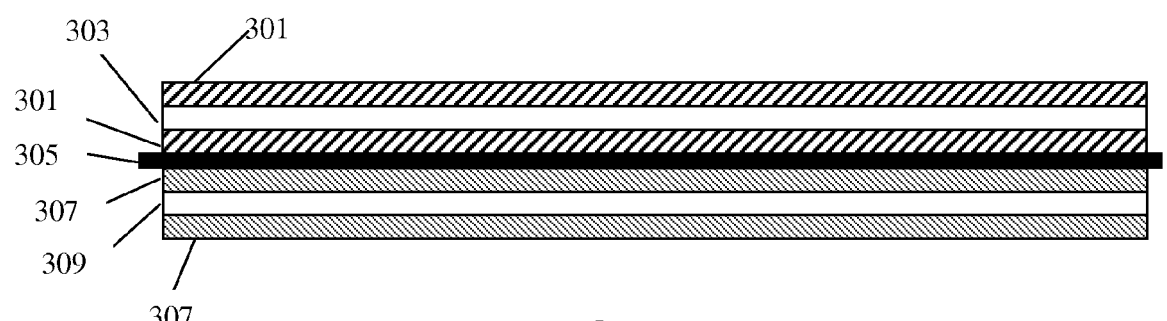
FIG. 3 illustrates the various layers in the negative electrode-separator-positive electrode sandwich structure in accordance with an embodiment of the present invention.

FIG. 3 illustrates the various layers in the negative electrode-separator-positive electrode sandwich structure before it is wound. The separator 305 mechanically separates the negative electrode (components 301 and 303) from the positive electrode (components 307 and 309) while allowing ionic exchange to occur between the electrodes and the electrolyte. The negative electrode includes electrochemically active layers 301 and a current collector 303. The electrochemically active layers 301 of the zinc negative electrode typically include zinc oxide and/or zinc metal as the electrochemically active material. As explained in the Appendix, the layer 301 may also include other additives or electrochemically active compounds such as calcium zincate, bismuth oxide, aluminum oxide, indium oxide, hydroxyethyl cellulose, and a dispersant.

The current collector 303 should be electrochemically compatible with the negative electrode materials 301. As described above, the current collector may have the structure of a perforated metal sheet, an expanded metal, a metal foam, or a patterned continuous metal sheet.

Opposite from the negative electrode on the other side of the separator 305 is the positive electrode. The positive electrode also includes electrochemically active layers 307 and a current collector 309. The layers 307 of the positive electrode may include nickel hydroxide, nickel oxide, and/or nickel oxyhydroxide as electrochemically active materials. Additives may include zinc oxide and cobalt oxide or cobalt metal. The current collector 309 may be a nickel metal foam matrix or nickel metal sheets. Note that if a nickel foam matrix is used, then layers 307 would be absorbed in the matrix.

The Separator

A separator serves to mechanically isolate the positive and negative electrodes, while allowing ionic exchange to occur between the electrodes and the electrolyte. The separator also blocks zinc dendrite formation. Dendrites are crystalline structures having a skeletal or tree-like growth pattern ("dendritic growth") in metal deposition. In practice, dendrites form in the conductive media of a power cell during the lifetime of the cell and effectively bridge the negative and positive electrodes causing shorts and subsequent loss of battery function.

Typically, a separator will have small pores. In certain embodiments described herein, the separator includes multiple layers. The pores and/or laminate structure may provide a tortuous path for zinc dendrites and therefore effectively bar penetration and shorting by dendrites. Preferably, the porous separator has a tortuosity of between about 1.5 and 10, more preferably between about 2 and 5. The average pore diameter is preferably at most about 0.2 microns, and more preferably between about 0.02 and 0.1 microns. Also, the pore size is preferably fairly uniform in the separator. In a specific embodiment, the separator has a porosity of between about 35 and 55% with one preferred material having 45% porosity and a pore size of 0.1 micron.

In a preferred embodiment, the separator comprises at least two layers (and preferably exactly two layers)—a barrier layer to block zinc penetration and a wetting layer to keep the cell wet with electrolyte, allowing ionic exchange. This is generally not the case with nickel cadmium cells, which employ only a single separator material between adjacent electrode layers.

Performance of the cell may be aided by keeping the positive electrode as wet as possible and the negative electrode relatively dry. Thus, in some embodiments, the barrier layer is located adjacent to the negative electrode and the wetting layer is located adjacent to the positive electrode. This arrangement improves performance of the cell by maintaining electrolyte in intimate contact with the positive electrode.

In other embodiments, the wetting layer is placed adjacent to the negative electrode and the barrier layer is placed adjacent to the positive electrode. This arrangement aids recombination of oxygen at the negative electrode by facilitating oxygen transport to the negative electrode via the electrolyte.

The barrier layer is typically a microporous membrane. Any microporous membrane that is ionically conductive may be used. Often a polyolefin having a porosity of between about 30 and 80 percent, and an average pore size of between about 0.005 and 0.3 micron will be suitable. In a preferred embodiment, the barrier layer is a microporous polypropylene. The barrier layer is typically about 0.5-4 mils thick, more preferably between about 1.5 and 4 mils thick.

The wetting layer may be made of any suitable wettable separator material. Typically the wetting layer has a relatively high porosity e.g., between about 50 and 85% porosity. Examples include polyamide materials such as nylon-based as well as wettable polyethylene and polypropylene materials. In certain embodiments, the wetting layer is between about 1 and 10 mils thick, more preferably between about 3 and 6 mils thick. Examples of separate materials that may be employed as the wetting material include NKK VL100 (NKK Corporation, Tokyo, Japan), Freudenberg FS2213E, Scimat 650/45 (SciMAT Limited, Swindon, UK), and Vilene FV4365.

Other separator materials known in the art may be employed. As indicated, nylon-based materials and microporous polyolefins (e.g., polyethylenes and polypropylenes) are very often suitable.

In an alternate embodiment, a single separator material may be used to block zinc penetration and to keep the cell wet with electrolyte. The single separator material may be a separator used in a conventional lithium ion cell but modified for use in the nickel zinc cell. For example, the lithium ion-type separator may be impregnated with a gel to improve its wettability characteristics. One such example is the polyethylene Teklon material available from Entek Membranes LLC, Lebanon, Oreg. This material is 20 microns thick with approximately 40% porosity. Gel may be provided to the separator directly or indirectly by, for example, be adding it to the zinc electrode.

In certain embodiments, the separator may be treated with a surfactant prior to incorporating into the anode/cathode structure. This serves to enhance the wettability and promote uniform current density. In a specific example, the separator is first treated with a solution of about 0.5-5% of a surfactant such as a Triton surfactant (e.g., X100) available from Dow Chemical Corporation of Midland Mich. The time of contact with the surfactant as well as the drying time, choice of surfactant, and concentration of surfactant are all factors that can impact the effectiveness of the treatment. Soaking for several hours in a dilute aqueous solution and subsequent air-drying can produce excellent results; additionally the use of other solvents such as methanol has been found to accelerate the uptake of the surfactant.

Another approach to rendering the micro-porous polypropylene wettable is to radiation graft specific hydrophyllic chemical groups onto the surface of the polymer. One such approach is used by Shanghai Shilong Hi-Tech Co. Ltd, Shanghai Institute of Applied Physics, Chinese Academy of Sciences. In this case the activation process is achieved using cobalt 60 irradiators.

Another consideration in the electrode/separator design is whether to provide the separator as simple sheets of approximately the same width as the electrode and currently collector sheet (e.g., FIG. 2) or to encase one or both electrodes in separator layers. In the latter example, the separator serves as a "bag" for one of the electrode sheets, effectively encapsulating an electrode layer. In some embodiments, encapsulating the negative electrode in a separator layer will aid in preventing dendrite formation. In other embodiments, however, use of a barrier layer sheet without encapsulating an electrode is sufficient protection against dendrite penetration.

The Positive Electrode

The positive electrode generally includes an electrochemically active nickel oxide or hydroxide and one or more additives to facilitate manufacturing, electron transport, wetting, mechanical properties, etc. For example, a positive electrode formulation may include at least an electrochemically active nickel oxide or hydroxide (e.g., nickel hydroxide ($Ni(OH)_2$)), zinc oxide, cobalt oxide (CoO), cobalt metal, nickel metal, and a flow control agent such as carboxymethyl cellulose (CMC). Note that the metallic nickel and cobalt may be chemically pure or alloys. In certain embodiments, the positive electrode has a composition similar to that employed to fabricate the nickel electrode in a conventional nickel cadmium battery, although there may be some important optimizations for the nickel zinc battery system.

A nickel foam matrix is preferably used to support the electroactive nickel (e.g., $Ni(OH)_2$) electrode material. In one example, commercially available nickel foam by Inco, Ltd. may be used. The diffusion path to the $Ni(OH)_2$ (or other electrochemically active material) through the nickel foam should be short for applications requiring high discharge rates. At high rates, the time it takes ions to penetrate the nickel foam is important. The width of the positive electrode, comprising nickel foam filled with the $Ni(OH)_2$ (or other electrochemically active material) and other electrode materials, should be optimized so that the nickel foam provides sufficient void space for the $Ni(OH)_2$ material while keeping the diffusion path of the ions to the $Ni(OH)_2$ through the foam short. The foam substrate thickness may be may be between 15 and 60 mils. In a preferred embodiment, the thickness of the positive electrode, comprising nickel foam filled with the electrochemically active and other electrode materials, ranges from about 16-24 mils. In a particularly preferred embodiment, positive electrode is about 20 mils thick.

The density of the nickel foam should be optimized to ensure that the electrochemically active material uniformly penetrates the void space of the foam. In a preferred embodiment, nickel foam of density ranging from about 300-500 $g/m^2$ is used. An even more preferred range is between about 350-500 $g/m^2$. In a particularly preferred embodiment nickel foam of density of about 350 $g/m^2$ is used. As the width of the electrode layer is decreased, the foam may be made less dense to ensure there is sufficient void space. In a preferred embodiment, a nickel foam density of about 350 $g/m^2$ and thickness ranging from about 16-18 mils is used.

Negative Electrode Composition

Generally the negative electrode includes one or more electroactive sources of zinc or zincate ions optionally in combination with one or more additional materials such as conductivity enhancing materials, corrosion inhibitors, wetting agents, etc. as described below. When the electrode is fabricated it will be characterized by certain physical, chemical, and morphological features such as coulombic capacity, chemical composition of the active zinc, porosity, tortuosity, etc.

In certain embodiments, the electrochemically active zinc source may comprise one or more of the following components: zinc oxide, calcium zincate, zinc metal, and various zinc alloys. Any of these materials may be provided during fabrication and/or be created during normal cell cycling. As a particular example, consider calcium zincate, which may be produced from a paste or slurry containing, e.g., calcium oxide and zinc oxide. If a zinc alloy is employed, it may in certain embodiments include bismuth and/or indium. In certain embodiments, it may include up to about 20 parts per million lead. A commercially available source of zinc alloy meeting this composition requirement is PG101 provided by Noranda Corporation of Canada.

The zinc active material may exist in the form of a powder, a granular composition, etc. Preferably, each of the components employed in a zinc electrode paste formulation has a relatively small particle size. This is to reduce the likelihood that a particle may penetrate or otherwise damage the separator between the positive and negative electrodes.

In addition to the electrochemically active zinc component(s), the negative electrode may include one or more additional materials that facilitate or otherwise impact certain processes within the electrode such as ion transport, electron transport (e.g., enhance conductivity), wetting, porosity, structural integrity (e.g., binding), gassing, active material solubility, barrier properties (e.g., reducing the amount of zinc leaving the electrode), corrosion inhibition etc. For example, in some embodiments, the negative electrode includes an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. It may facilitate recombination of hydrogen and oxygen. Indium oxide may be present in a concentration of between about 0.05 and 1% by weight of a dry negative electrode formulation. Aluminum oxide may be provided in a concentration of between about 1 and 5% by weight of a dry negative electrode formulation.

In certain embodiments, one or more additives may be included to improve corrosion resistance of the zinc electroactive material and thereby facilitate long shelf life. The shelf life can be critical to the commercial success or failure of a battery cell. Recognizing that batteries are intrinsically chemically unstable devices, steps should be taken to preserve battery components, including the negative electrode, in their chemically useful form. When electrode materials corrode or otherwise degrade to a significant extent over weeks or months without use, their value becomes limited by short shelf life. Examples of corrosion inhibiting additives include cations of indium, bismuth, lead, tin, calcium, etc. Generally, these may be present in a negative electrode in the form of salts (e.g., sulfates, fluorides, etc.) at concentrations of up to about 25% by weight of a dry negative electrode formulation, typically up to about 10% by weight. In certain embodiments, organic materials may be included in the electrode formulation to inhibit corrosion of the zinc electroactive material. Examples of such inhibitors include surfactants such as commercially available Triton and RS600 surfactants.

Specific examples of anions that may be included to reduce the solubility of zinc in the electrolyte include phosphate, fluoride, borate, zincate, silicate, stearate, etc. Generally, these anions may be present in a negative electrode in concentrations of up to about 5% by weight of a dry negative electrode formulation. It is believed that at least certain of these anions go into solution during cell cycling and there they reduce the solubility of zinc. Examples of electrode formulations including these materials are included in the following patents and patent applications, each of which is incorporated herein by reference for all purposes: U.S. Pat. No. 6,797,433, issued Sep. 28, 2004, titled, "Negative Electrode Formulation for a Low Toxicity Zinc Electrode Having Additives with Redox Potentials Negative to Zinc Potential," by Jeffrey Phillips; U.S. Pat. No. 6,835,499, issued Dec. 28, 2004, titled, "Negative Electrode Formulation for a Low Toxicity Zinc Electrode Having Additives with Redox Potentials Positive to Zinc Potential," by Jeffrey Phillips; U.S. Pat. No. 6,818,350, issued Nov. 16, 2004, titled, "Alkaline Cells Having Low Toxicity Rechargeable Zinc Electrodes," by Jeffrey Phillips; and PCT/NZ02/00036 (publication no. WO 02/075830) filed Mar. 15, 2002 by Hall et al.

Examples of materials that may be added to the negative electrode to improve wetting include titanium oxides, alumina, silica, alumina and silica together, etc. Generally, these materials are provided in concentrations of up to about 10% by weight of a dry negative electrode formulation. A further discussion of such materials may be found in U.S. Pat. No. 6,811,926, issued Nov. 2, 2004, titled, "Formulation of Zinc Negative Electrode for Rechargeable Cells Having an Alkaline Electrolyte," by Jeffrey Phillips, which is incorporated herein by reference for all purposes.

Examples of materials that may be added to the negative electrode to improve electronic conductance include various electrode compatible materials having high intrinsic electronic conductivity. Examples include titanium oxides, etc. Generally, these materials are provided in concentrations of up to about 10% by weight of a dry negative electrode formulation. The exact concentration will depend, of course, on the properties of chosen additive.

Various organic materials may be added to the negative electrode for the purpose of binding, dispersion, and/or as surrogates for separators. Examples include hydroxylethyl cellulose (HEC), carboxymethyl cellulose (CMC), the free acid form of carboxymethyl cellulose (HCMC), polytetrafluoroethylene (PTFE), polystyrene sulfonate (PSS), polyvinyl alcohol (PVA), nopcosperse dispersants (available from San Nopco Ltd. of Kyoto Japan), etc. In a specific example, PSS and PVA are used to coat the negative electrode to provide wetting or other separator-like properties. In certain embodiments, when using a separator-like coating for the electrode, the zinc-nickel cell may employ a single layer separator and in some embodiments, no independent separator at all. In certain embodiments, polymeric materials such as PSS and PVA may be mixed with the paste formation (as opposed to coating) for the purpose of burying sharp or large particles in the electrode that might otherwise pose a danger to the separator.

Various negative electrode compositions within the scope of this invention are described in the following documents, each of which is incorporated herein by reference: PCT Publication No. WO 02/39517 (J. Phillips), PCT Publication No. WO 02/039520 (J. Phillips), PCT Publication No. WO 02/39521, PCT Publication No. WO 02/039534 and (J. Phillips), US Patent Publication No. 2002182501. Negative electrode additives in the above references include, for example, silica and fluorides of various alkaline earth metals, transition metals, heavy metals, and noble metals.

Finally, it should be noted that while a number of materials may be added to the negative electrode to impart particular properties, some of those materials or properties may be introduced via battery components other than the negative electrode. For example, certain materials for reducing the solubility of zinc in the electrolyte may be provided in the electrolyte or separator (with or without also being provided to the negative electrode). Examples of such materials include phosphate, fluoride, borate, zincate, silicate, stearate. Other electrode additives identified above that might be provided in the electrolyte and/or separator include surfactants, ions of indium, bismuth, lead, tin, calcium, etc.

Negative Electronic Conduction Pathway

The negative electronic pathway is comprised of the battery components that carry electrons between the negative electrode and the negative terminal during charge and discharge. One of these components is a carrier or current collection substrate on which the negative electrode is formed and supported. This is a subject of the present invention. In a cylindrical cell design, the substrate is typically provided within a spirally wound sandwich structure that includes the negative electrode material, a cell separator and the positive electrode components (including the electrode itself and a positive current collection substrate). As indicated, this structure is often referred to as a jellyroll. Other components of the negative electronic pathway are depicted in FIG. 1A. Typically, though not necessarily, these include a current collector disk (often provided with a conductive tab) and a negative cell terminal. In the depicted embodiment, the disk is directly connected to the negative current collector substrate and the cell terminal is directly attached to the current collector disk (often via the conductive tab). In a cylindrical cell design, the negative cell terminal is usually either a cap or a can.

Each of the components of the negative electronic conduction pathway may be characterized by its composition, electrical properties, chemical properties, geometric and structural properties, etc. For example, in certain embodiments, each element of the pathway has the same composition (e.g., zinc coated copper or tin/zinc coated copper). In other embodiments, at least two of the elements have different compositions.

The Current Collector

An element of the conductive pathway that is the subject of this application is the carrier or substrate for the negative electrode, which also serves as a current collector. The current collection substrate can be provided in various structural forms including perforated metal sheets, expanded metals, metal foams, etc. In a specific embodiment, the substrate is a perforated sheet or an expanded metal made from a copper or brass based material. In certain embodiments, the substrate is a perforated sheet having a thickness between about 2 and 5 mils. In certain embodiments, the substrate is an expanded metal having a thickness between about 2 and 20 mils. In other embodiments, the substrate is a metal foam having a thickness of between about 15 and 60 mils. In a specific embodiment, the carrier is about 3-4 mils thick perforated copper. A specific range for the thickness of the negative electrode, including the carrier metal and negative electrode material is about 10 to 24 mils.

Regardless of the type of copper or brass based current collector employed, the resulting current collector structure may have many different physical structures. In certain embodiments, it is provided as a continuous smooth foil. In certain embodiments, it may be perforated. It may be perforated with circles or ovals or rectangles or other geometric shapes. In some cases, its surface may be patterned or roughened to allow for better physical contact with the electrochemically active layer. In certain embodiments, the current collector may be an expanded metal having a thickness of, e.g., about 2-20 mils. In other embodiments, the current collector may be a foam material having a thickness of, e.g., between about 15 and 60 mils.

Among the criteria to consider when choosing a material and structure for the substrate are electrochemically compatible with the negative electrode materials, cost, ease of coating (with the negative electrode material), suppression of hydrogen evolution, and ability to facilitate electron transport between the electrochemically active electrode material and the current collector. The current collector of the present invention meets these criteria and, in some cases, performs better than current collectors with other designs.

The current collector utilizes a copper or brass based substrate, covered with at least one intermetallic compound and alloys of tin and copper and in some cases, tin, copper, and zinc. The alloys and intermetallic compounds are formed from baking a substrate plated with tin or both tin and zinc. During baking, copper from the base substrate diffuses into the plated metal and the diffused copper will have an electrochemical reaction with zinc in the negative paste. Therefore, this diffusion process will promote corrosion (i.e., more gassing) and degrade the battery performance. Furthermore, the copper atoms also react with tin atoms to form one or more intermetallic compounds layer at the interface during baking process. The type of compound formed depends on the plating thickness. For 20 μIn thickness, there is no intermetallic compound formed. For the 40-80 μIn plating thickness, the intermetallic compound formed is $Cu_3Sn$. For 200 μIn plating thickness, the intermetallic compounds formed are $Cu_3Sn$ (~5-15%) and $Cu_6Sn_5$ (~85-95%). Formation of intermetallic compound $Cu_3Sn$ is preferred and the formation of compound $Cu_6Sn_5$ should be avoided because of their physical property and plating layer structure differences.

Figure 4A:
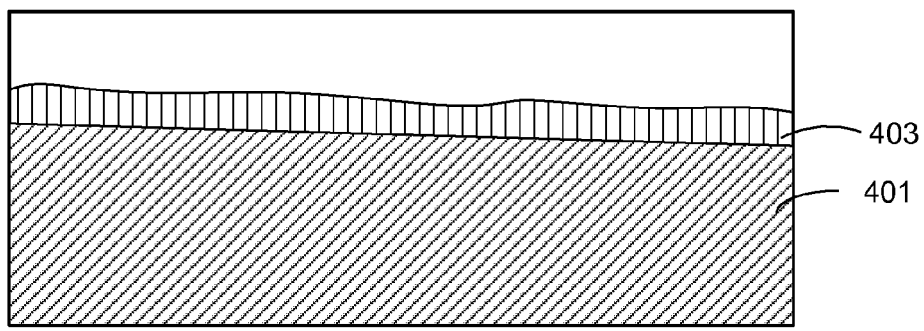
FIG. 4A-4C illustrates a cross section of plated and baked substrates of different electroplated thicknesses under SEM magnification.
Figure 4B:
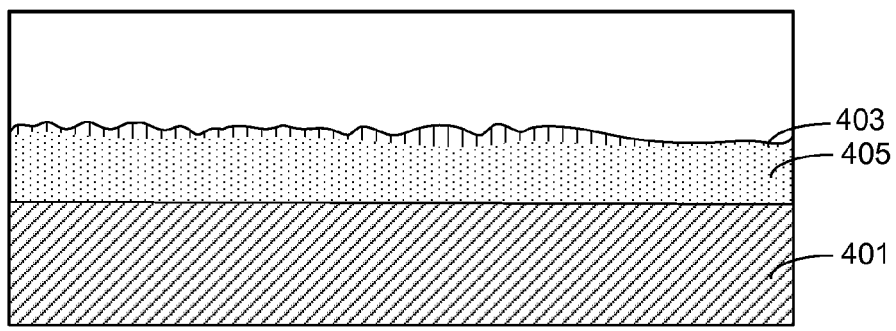
Figure 4C:
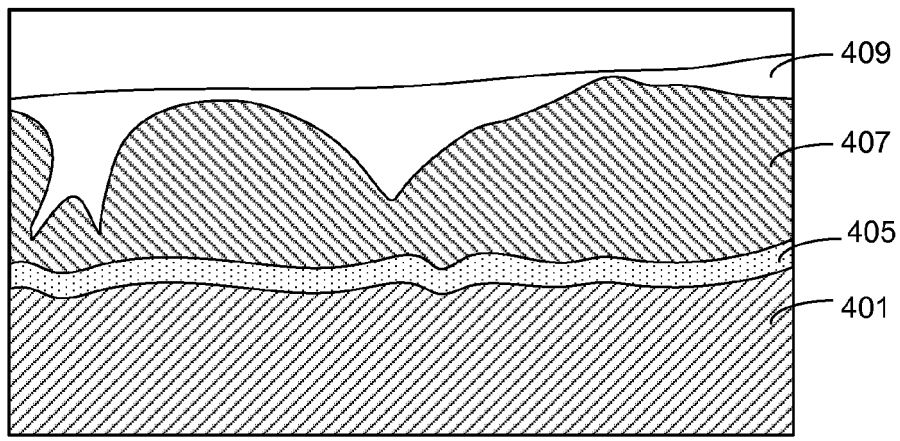

It was found that intermetallic compounds $Cu_3Sn$ and/or $Cu_6Sn_5$, may be formed depending on thickness plated. In one case, tin plated copper substrates were baked for about 45 minutes at 260° C., imaged with a scanning electron microscope (SEM) and analyzed with Energy Dispersive X-ray (EDX). The SEM images of baked substrates at various thicknesses are depicted in FIG. 4. At plated thickness of about 20 μIn as shown in FIG. 4A, a tin/copper alloy (403) was formed. The base substrate is shown as layer 401 and is all copper. As shown in FIG. 4B, at plated thickness of about 60 μIn, tin/copper alloy (403) and intermetallic compound $Cu_3Sn$ (405) were formed. As shown in FIG. 4C, at plated thickness of about 200 μIn, only very little $Cu_3Sn$ (layer 405) was found, the rest were $Cu_6Sn_5$ (layer 407) and pure tin (layer 409).

As used herein, intermetallic compounds are solid phases containing two or more metallic elements with a certain atomic ratio or a very small range of composition for one component, with optionally one or more non metallic elements, whose structure is distinct from that of any of the constituents. An intermetallic compound may or may not have metallic properties. For example, some intermetallic compounds, e.g., $Cu_6Sn_5$, are brittle and do not bend. Alloys, on the other hand, are homogeneous mixtures of two or more elements without any atomic ratio limitation for any component, at least one of which is a metal, and where the resulting material has metallic properties.

When tin and zinc are electroplated and baked, the similar structures of plating layer were observed comparing with tin plating for different plating thicknesses, i.e., for 20 μIn thickness, there is no compound formed. For the 40-80 μIn plating thickness, compound formed is $Cu_3Sn$. For 200 μIn plating thickness, the compounds formed comprise $Cu_3Sn$ (~5-15%) and $Cu_6Sn_5$ (~85-95%). Zinc may dissolve in the two types of compounds to a certain degree.

The intermetallic compounds $Cu_3Sn$ and $Cu_6Sn_5$ have different properties. The intermetallic compound $Cu_6Sn_5$ forms large, irregular shapes. $Cu_6Sn_5$ is also brittle and less conductive than $Cu_3Sn$. As mentioned before, one of the substrate design considerations is its ability to withstand manufacturing operations. In one test, $Cu_6Sn_5$ became cracked during subsequent electrode winding process. The cracked $Cu_6Sn_5$ damaged the coating layer and allowed more corrosion reactions at the base substrate surface. The material, if separated from the substrate during manufacturing, may become a source of contaminants in subsequent operations. The cracked $Cu_6Sn_5$ may lead to more hydrogen evolution during battery operations. As discussed above, even with a venting cap, hydrogen evolution is undesirable. The reduced conductivity would negatively affect cell performance. Thus, the formation of $Cu_6Sn_5$ is to be avoided.

To avoid the formation of $Cu_6Sn_5$, the plated thickness must be small. As discussed above, the formation of intermetallic compounds and alloys are affected by the plated thickness before baking. If the plated thickness is too thin however, the substrate may not be adequately protected against corrosion. It was found that a thickness of about 40-80 μIn is adequate for corrosion resistance concerns and yet eliminates the formation of $Cu_6Sn_5$ layers. Preferably, a thickness of about 60 μIn for plated tin and about 55 μIn for plated tin and zinc may be used.

The plated substrate surface may have a matte finish. The matte finish helps the electrochemically active material adhere to the surface of the plated substrate. Additionally, brightener additives typically used in commercial plating baths may be incorporated into the plated layer and can degrade the plated layer. Using a plating bath without the brightener additives ensures a matt finish without degradation.

Manufacturing Process

Figure 5:
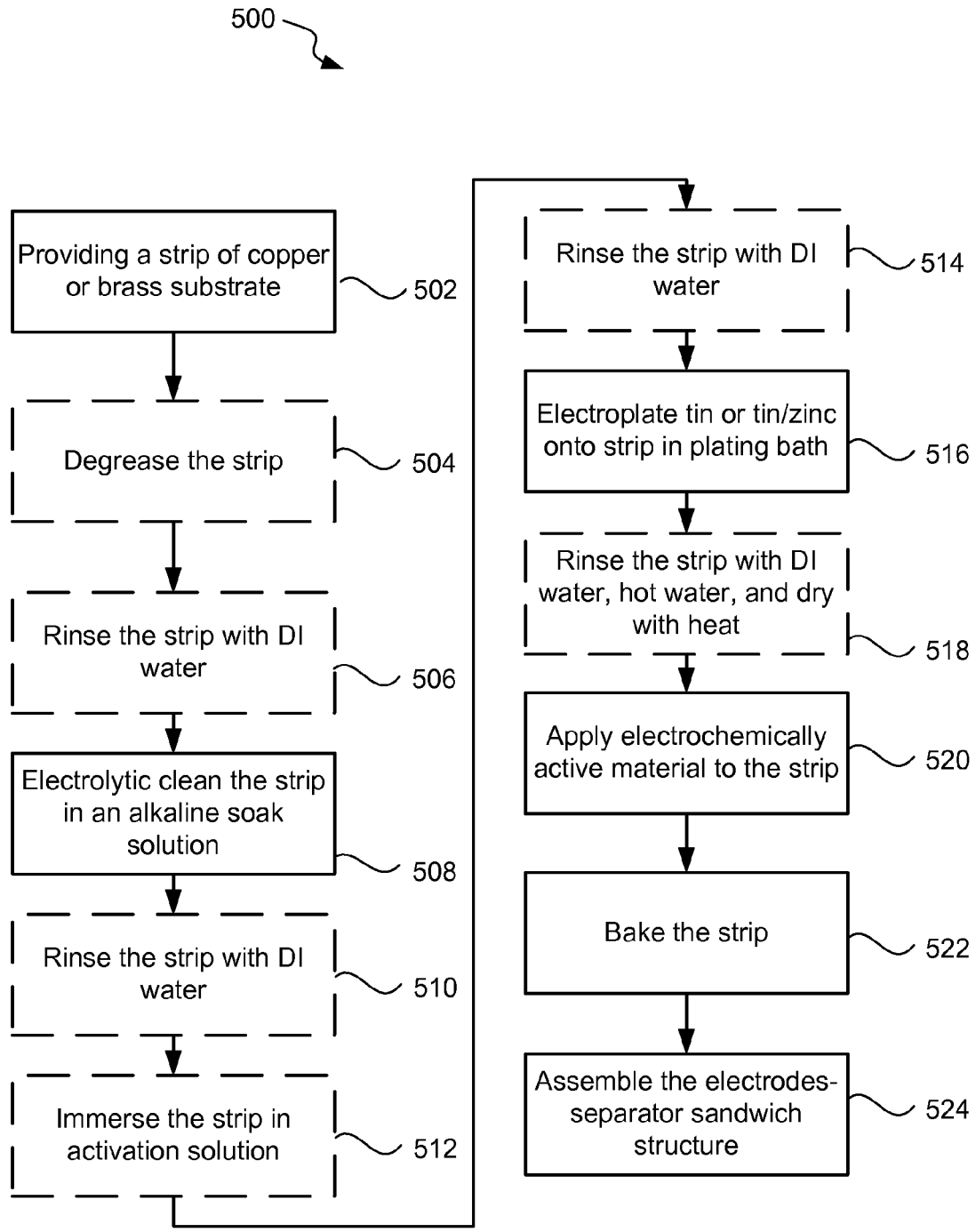
FIG. 5 is a process flow diagram of a method embodiment in accordance with the present invention.

Current collectors of the present invention may be made with a process shown as a flow diagram in FIG. 5, which shows a portion of the nickel zinc cell manufacture process up to the assembly of the electrodes-separator sandwich structure. In step 502, a substrate perforated strip is provided. The substrate strip may be made of copper or an alloy of copper such as brass. The substrate may also contain small amounts of one or more elements, such as bismuth, indium, or lead. In one example, the substrate may be 99.7% copper foil with a thickness of about 4 mils.

The length and width of the substrate may differ depending on the size of battery (height of the cell determines width of the substrate) and the manufacturing process (size of the various baths determines the length of the substrate). To test the substrates, 6 inch long strips were used. In another case, 15 inch long strips are used. A full scale manufacturing process may use longer strips, e.g., 12,000 inches, or even longer. For manufacturing a sub-C cell, the width may be 1.325 inches. Larger battery cell would require wider strips. In some cases, even wider strips two times to ten times the width used in one cell may be used if it is cut longitudinally after electroplating into appropriately sized pieces.

The perforated strip degreased remove grease and dirt (504). Denatured alcohol, acetone, or other organic solvent may be applied to the perforated strip for 1 to 15 minutes. In some cases, this step may not occur, for example, if the strips were never handled and thus has no grease or dirt. However, often the manufacturing process of the strips produces copper or brass strips with machine grease, which must be removed. After degreasing the strip, it may be optionally rinsed with deionized (DI) water for 10-30 seconds in operation 506.

The perforated strip is electrolytic cleaned in an alkaline soak solution (508). During electrolytic cleaning, a current is applied down the length of the substrate while it soaks in the alkaline solution. The electrolytic cleaning ensures that the surface to be plated is pure, uniform and smooth. For a 15 inch long strip, a current of 1-3 amps or 2 amps may be applied. For longer strips, the current should be higher. The alkaline soak solution may have a pH of about 10-13. The solution may include an alkaline hydroxide, an alkaline carbonate, and an alkaline phosphate. For example, the solution may include sodium hydroxide, sodium carbonate, and sodium phosphate or sodium acetate. The solution may also include potassium hydroxide, potassium carbonate, and potassium phosphate, or a combination sodium and potassium hydroxide, carbonate, and phosphate. In one example, the sodium hydroxide is provided at a concentration about 30-60 grams per liter. The sodium carbonate is provided at a concentration of about 40-90 grams per liter. The sodium phosphate is provided at a concentration of 50-90 grams per liter. After the electrolytic cleaning, the perforated strip may be rinsed with DI water in operation 510 for 10-30 seconds.

To further prepare the surface for electroplating, the perforated strip may be immersed in an activation solution (512). The activation solution may be a strong acid having a pH of about 1. One example of such acid is sulfuric acid at an acid concentration of about 4-20%. Other strong acids may be used, e.g., hydrochloric acid, nitric acid, and the like. For example, the perforated strip may be immersed in sulfuric acid having an acid concentration of about 4% for about 5-10 minutes. In some embodiments, a weaker acid may be used with a higher pH, for example, a pH of about 3 or 4. For example, hydrobromic acids may be used in some cases. The use of weak acid may require a longer immersion time. The immersion in activation solution renders the surface more active, and subsequently electroplated layers bond better. The substrate surface becomes less reflective or shiny and may appear less yellow or red. After the activating, the perforated strip may be rinsed with DI water in operation 514 for 10-30 seconds.

The substrate may be electroplated with tin or both tin and zinc in a plating bath (516). For tin plating, the electroplating bath includes tin ion or zinc ion sources, a current carrier source, and no brightening agent. As discussed above, a brightening agent may become incorporated into the electroplated layer and cause degradation. Also a bright surface may not adhere well to electrochemically active layers. The bath may also include an oxidation retardant and/or an anti-treeing agent. Treeing is a phenomenon where the electroplated layer grows into excessive irregular shapes, e.g., dendrites. Treeing may reduce the life of a cell because it may create undesired conductive pathways or cause non-uniform depletion of the electrochemically active materials. The irregular shapes may grow during battery operation and puncture the separator to cause a short circuit between the negative and positive electrodes by forming an undesired conductive pathway. The irregular shape may also increase concentration of certain particles, e.g., zinc, in certain localized areas and cause non-uniform depletion of the electrochemically active materials.

In one embodiment, the tin ion source is stannous sulfate, the current carrier source is an acid, the oxidation retardant is a sulfonic acid, and the anti-treeing agent is naphthol, glue, gelatin, or cresol. Other sources of tin ions may be used, e.g., stannous chloride ($SnCl_2$) or stannous methanesulfonate ($Sn(CH_3SO_3)_2$). The current carrier source may be any acid that can provide sufficient conductivity for the plating bath. For example, the current carrier source may be sulfuric acid, acetic acid, boric acid, sodium sulfate, or sulfamic acid at a concentration of about 50-100 grams per liter. The oxidation retardant serves to retard the oxidation of stannous tin and may be cresolsulfonic or phenolsulfonic acids. The concentration may be about 50-100 grams per liter. Anti-treeing agents may be naphthol, dihydroxydiphenylsulfone, glue, gelatin, or cresol. The naphthol or dihydroxydiphenylsulfone may be used at a concentration of 0.5-10 grams per liter. Glue, gelatin, or cresol may be used at a concentration of 0.2-12 grams per liter.

In another embodiment where both tin and zinc are deposited, the plating bath also includes a zinc ion source. For example, the zinc ion source may be zinc chloride ($ZnCl_2$), zinc sulfate ($ZnSO_4$) or zinc pyrophosphate ($Zn_2P_2O_7$) at a concentration about 10-100 grams per liter. Other zinc ion source may be appropriately substituted.

A layer of metal approximately 40-80 μIn thick may be electroplated onto the substrate. During the electroplating, the whole substrate or a part of the substrate may be immersed in the bath. In a continuous manufacturing environment, portions of the substrate may be alternatively immersed in the electroplating bath. In one embodiment, about 60 μIn of tin is electroplated onto the substrate on each side. In another embodiment, about 55 μIn of tin and zinc in a ratio of 5 Sn:1 Zn is electroplated onto the substrate on each side. As discussed herein, the thickness of electroplating determines the intermetallic compounds formed during the baking operation. The electroplated layer covering the substrate may be tin or a tin alloy or intermetallic compound. The electroplated layer may also include some copper as part of the tin alloy. The composition of the electroplated layer may be in a gradient—the portion closest to the base substrate containing a higher percentage of copper and the portion closest to the electroplating bath containing a lower percentage or no copper.

The current density applied to the substrate is unexpectedly found to affect the substrate's test results. Even when the same thickness is electroplated, the inventor found a current density that is especially beneficial to reducing the substrate gassing rate. The current density may be 40-80 $A/m^2$ for a period of about 4-6 minutes for both tin and tin-zinc platings. In certain embodiments, current density may be 40-70, or about 60 A/m² for about 4-6 minutes for both tin and tin-zinc platings.

The plating process is specifically operated at room temperature and the filtering and circulation of the plating bath may be necessary during manufacturing the plated strips continuously.

The anode used during electroplating may be pieces of elemental metal. For plating tin and zinc, an alloy of tin and zinc or individual pieces of tin and zinc may be used. The material electroplated may be about 75-100% weight tin and about 0-25% weight zinc. One skilled in the art would be able to modify these electroplating bath compositions and plating conditions to arrive at a desired ratio of plated tin and zinc. A ratio of about 4 Sn:1 Zn to 7 Sn:1 Zn, or 10 Sn to 2 Zn, may be electroplated to manufacture a current collector in accordance with the present invention.

After electroplating, the plated substrate may be rinsed with DI water, hot water, and dried with heat (518). The heat drying is not intended to cause any structural or morphology change, but merely to thoroughly evaporate all the rinse from the substrate. Thus, a small amount of heat may be applied.

Electrochemically active material may be applied to the plated substrate strip (520). The composition of these electrochemically active materials is discussed previously. Usually in the form of a paste, these materials are applied to one or both sides of the substrate strip. Mechanical devices may be used to ensure a smooth application, such as a roller. The perforated strip may be baked by maintaining a higher than ambient temperature for a period of time (522). The baking evolves polymers from the electrochemically active material and promotes diffusion of the electroplated substrate and metal, which forms intermetallic compounds. Temperature of 200-350° C. may be maintained for 30 minutes to about 2 hours. In one embodiment, temperature of about 260° C. may be maintained for about 45 minutes.

After the negative electrode materials are baked, they may be assembled into the electrodes-separator sandwich structure (524) discussed above. The negative electrode material, separator, and the positive electrode are layered on top of one another to form this sandwich structure. The entire structure may be cut into appropriately sized pieces to rolling and further cell manufacturing. In some embodiments, the cutting operation may occur before baking the strips, so that exposed copper or brass edges are also baked. In other embodiments, the substrates are cut after baking to allow better attachment of other cell structures to the edges of the substrates and prior to assembling the sandwich.

Well known process operations have not been described in detail in order not to unnecessarily obscure the present invention. More details of a method of manufacturing a zinc negative electrode is disclosed in U.S. patent application Ser. No. 10/921,062 (J. Phillips), filed Aug. 17, 2004, hereby incorporated by reference in its entirety for all purposes. While this invention has been described using nickel zinc batteries as examples, the invention is not so limited. Current collectors in accordance with the present invention may be employed in any of a number of cells employing zinc electrodes. These include, e.g., zinc air cells, silver zinc cells, and zinc manganese dioxide cells.

Gassing Test Results

Gassing tests were performed for substrates electroplated under various conditions to find the design and manufacturing conditions yielding lowest gassing rates. In one test, substrates plated to various thicknesses were compared. The gassing rates were measured by combining the plated and baked substrate, electrolyte, and electrochemically active material into an air tight bottle and measuring the amount of gas generated over three days. The amount of material added to the test bottle was determined to mimic the relative compositions in a battery cell. Thus the gassing rate results would correlate to that in a manufactured battery cell.

Figure 6:
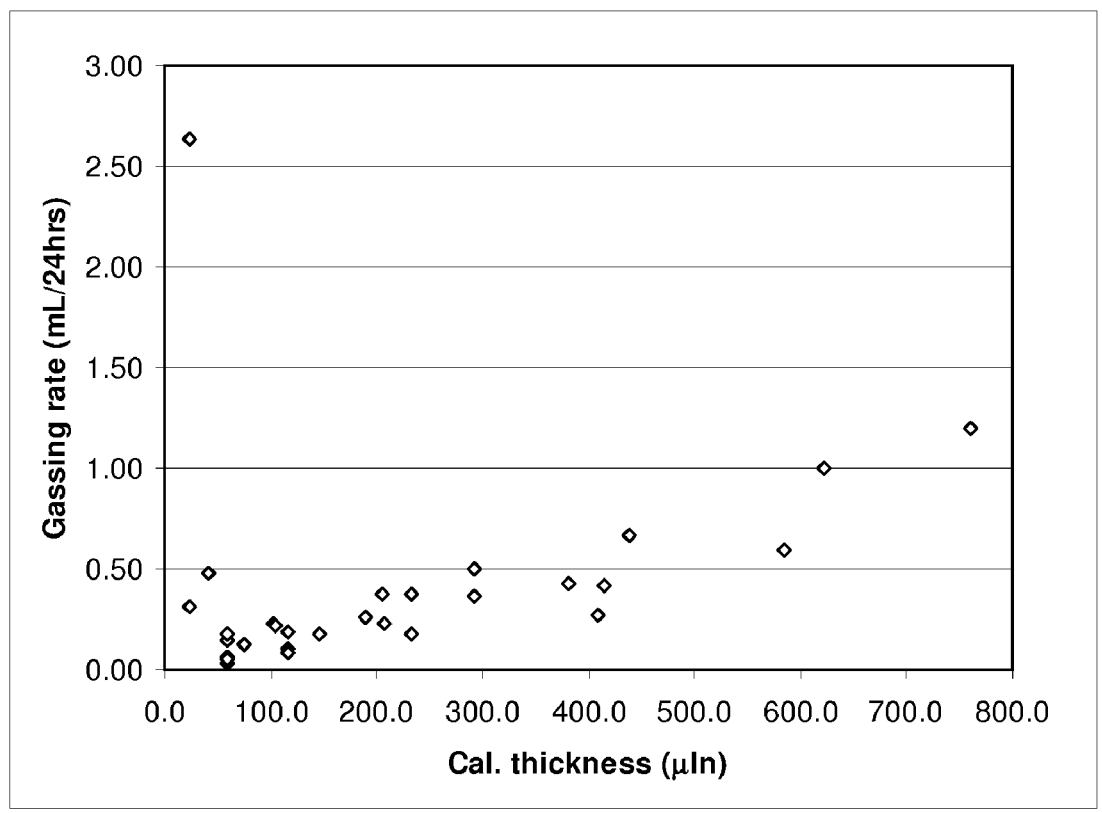
FIG. 6 is plot of gassing rate measured for substrates electroplated at various calculated thicknesses.

FIG. 6 is a plot of the test data. The gassing rate was measured over three days and averaged to find an average milliliter per 24 hour rate and plotted against the thickness of electroplated layer. The thicknesses are calculated based on the current applied and time over the sample area and thus is a theoretical value not including any parasitic reactions. These calculated thicknesses were correlated to measured thicknesses using Sheffield Platers and found to be close to measured thicknesses. For example, for a theoretical thickness of 58.7 μIn, 26 measurements had a mean of 53.1 with a standard deviation of 9.81 μIn. The thickness measurements show that the theoretical (calculated) thicknesses correlate well with the measured values.

The plot of the gassing rates showed that at very low thicknesses, the gassing rate was high. It is believed that a thin electroplated layer may not uniformly coat the entire substrate and leave exposed substrates to react and evolve hydrogen. However, at about 1.5 μm, or about 60 μIn, the gassing rate was at its lowest for tin plating; and at about 1.4 μm, or about 55 μIn, the gassing rate was at its lowest for a tin-zinc plating in a ratio of 5Sn:1Zn. The gassing rate slowly increases as more metal is electroplated. The increased gassing rate is consistent with the increased formation of intermetallic layer $Cu_6Sn_5$. It is believed that a thick layer of $Cu_6Sn_5$ may crack to expose the substrate to evolve hydrogen. Alternatively, the intermetallic compound $Cu_6Sn_5$ may contribute directly to hydrogen evolution.

What is claimed is:

1. A method to manufacture a zinc electrode substrate for a nickel zinc battery cell, the method comprising:
   (a) providing a strip of substrate material, said substrate material comprising copper;
   (b) electrolytically cleaning the strip;
   (c) electroplating 40-80 μIn of metal onto the strip in an electrolyte bath comprising a tin ion source;
   (d) pasting a layer of zinc oxide based electrochemically active material onto the plated substrate; and
   (e) baking the plated substrate and paste by maintaining a higher than ambient temperature for a period of time to form an intermetallic compound layer comprising less than 10% $Cu_6Sn_5$ with the balance $Cu_3Sn$.

2. The method of claim 1, wherein the metal deposited further comprises zinc from a zinc ion source in the electrolyte bath.

3. The method of claim 2, wherein the metal deposited comprises about 75-100% weight tin and about 0-25% weight zinc.

4. The method of claim 1, wherein the substrate material further comprises zinc, wherein the copper and zinc form a brass alloy.

5. The method of claim 1, wherein the electrolytic cleaning is performed for a period of about 5-10 minutes in an alkaline soak solution.

6. The method of claim 5, wherein the alkaline soak solution has a pH of about 10-13.

7. The method of claim 6, wherein the alkaline soak solution comprises an alkaline hydroxide, an alkaline carbonate, and an alkaline phosphate.

8. The method of claim 1, further comprising activating the strip, after (b) and before (c), wherein the activation operation comprises immersing the strip in an activation solution comprising an acid.

9. The method of claim 8, wherein the activation solution has a pH of about 0.2-3.

10. The method of claim 8, wherein the activation solution comprises sulfuric acid at an acid concentration of 4-20%.

11. The method of claim 1, wherein the electroplating operation occurs at a current density about 40-80 $A/m^2$ for a period of about 4-6 minutes.

12. The method of claim 1, wherein the electroplating bath comprises a current carrier source and no brightening agent.

13. The method of claim 1, wherein the plating bath has a pH of about 0.1-3.

14. The method of claim 13, wherein the electroplating bath further comprises an oxidation retardant and an anti-treeing agent.

15. The method of claim 14, wherein the tin ion source is stannous sulfate, the oxidation retardant is a sulfonic acid, and the anti-treeing agent is selected from the group consisting of naphthol, gelatin, and cresol.

16. The method of claim 2, wherein the electroplating bath comprises a current carrier source and no brightening agent.

17. The method of claim 16, wherein the electroplating bath further comprises an oxidation retardant and an anti-treeing agent, and wherein the tin ion source is stannous sulfate, the zinc ion source is zinc sulfate, the current carrier source is an acid, the oxidation retardant is a sulfonic acid, and the anti-treeing agent is selected from the group consisting of naphthol, gelatin, and cresol.

18. The method of claim 1, wherein the baking operation comprises maintaining the substrate at a temperature of about 200-350° C. for a period of about 30 minutes to 2 hours.

19. The method of claim 1, wherein (c) comprises electroplating metal consisting essentially of
(i) tin or
(ii) tin and zinc.

* * * * *